US009020354B2

(12) United States Patent
Eber et al.

(10) Patent No.: US 9,020,354 B2
(45) Date of Patent: *Apr. 28, 2015

(54) APPARATUS, SYSTEMS AND METHODS FOR COMPENSATING INFRARED NOISE IN AN ELECTRONIC SYSTEM

(71) Applicant: EchoStar Technologies L.L.C., Englewood, CO (US)

(72) Inventors: Samuel Eber, Denver, CO (US); Eric Hieb, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/919,235

(22) Filed: Jun. 17, 2013

(65) Prior Publication Data
US 2013/0272715 A1 Oct. 17, 2013

Related U.S. Application Data

(63) Continuation of application No. 12/643,602, filed on Dec. 21, 2009, now Pat. No. 8,467,685.

(51) Int. Cl.
H04B 10/00 (2013.01)
H04B 13/02 (2006.01)
G08C 23/04 (2006.01)
H04B 10/114 (2013.01)

(52) U.S. Cl.
CPC ............ *G08C 23/04* (2013.01); *H04B 10/1141* (2013.01)

(58) Field of Classification Search
CPC ............................ G08C 23/04; H04B 10/1141

USPC .......................................... 398/106, 208, 119
See application file for complete search history.

(56) References Cited

U.S. PATENT DOCUMENTS

| 3,928,760 | A | * | 12/1975 | Isoda | 398/131 |
|---|---|---|---|---|---|
| 4,475,038 | A | * | 10/1984 | Lochmann et al. | 250/269.6 |
| 4,864,647 | A | * | 9/1989 | Harrington | 398/126 |
| 4,897,883 | A | * | 1/1990 | Harrington | 398/126 |
| 5,045,843 | A | * | 9/1991 | Hansen | 345/158 |
| 5,331,450 | A | * | 7/1994 | Heep et al. | 398/92 |
| 5,917,631 | A | * | 6/1999 | Shafer | 398/106 |
| 6,094,238 | A | * | 7/2000 | Shafer | 348/734 |
| 6,097,520 | A | * | 8/2000 | Kadnier | 398/106 |
| 6,346,702 | B1 | * | 2/2002 | Davis et al. | 250/227.14 |
| 6,703,778 | B2 | | 3/2004 | Watanabe et al. | |
| 6,812,466 | B2 | * | 11/2004 | O'Connor et al. | 250/341.1 |
| 7,194,209 | B1 | | 3/2007 | Robbins et al. | |
| 8,076,628 | B2 | * | 12/2011 | Mahowald | 250/214 AL |
| 2001/0035705 | A1 | | 11/2001 | Watanabe et al. | |
| 2002/0143555 | A1 | * | 10/2002 | Luchaup | 704/277 |
| 2002/0160729 | A1 | * | 10/2002 | Patterson et al. | 455/115 |
| 2003/0034898 | A1 | * | 2/2003 | Shamoon et al. | 340/825.72 |

(Continued)

Primary Examiner — Ken Vanderpuye
Assistant Examiner — Abbas H Alagheband
(74) Attorney, Agent, or Firm — Lowe Graham Jones PLLC

(57) ABSTRACT

Remote control signal detection systems and methods are operable to compensate detected infrared energy to identify an infrared energy communication signal emitted by a remote control. An exemplary embodiment detects first infrared energy, wherein the infrared energy communication signal is absent in the first infrared energy; determines compensation based on the first infrared energy; detects second infrared energy, wherein the infrared energy communication signal is present in the second infrared energy; and compensates the second infrared energy based on the determined compensation.

20 Claims, 4 Drawing Sheets

(56) References Cited

U.S. PATENT DOCUMENTS

| | | | |
|---|---|---|---|
| 2003/0066080 A1* | 4/2003 | Kamieniecki | 725/80 |
| 2003/0095212 A1* | 5/2003 | Ishihara | 348/734 |
| 2004/0103443 A1* | 5/2004 | Kuznetsov et al. | 725/132 |
| 2005/0047794 A1 | 3/2005 | Quintanar | |
| 2005/0117912 A1* | 6/2005 | Patterson et al. | 398/135 |
| 2007/0025736 A1* | 2/2007 | Kleewein et al. | 398/135 |
| 2007/0201578 A1* | 8/2007 | Kuznetsov et al. | 375/295 |
| 2008/0074353 A1 | 3/2008 | Bae | |
| 2008/0154806 A1* | 6/2008 | Morris | 706/12 |
| 2008/0174467 A1* | 7/2008 | Drimusz et al. | 341/176 |
| 2009/0245803 A1* | 10/2009 | Garner et al. | 398/106 |
| 2009/0245804 A1* | 10/2009 | Garner et al. | 398/106 |
| 2010/0072351 A1* | 3/2010 | Mahowald | 250/214 AL |
| 2010/0095346 A1* | 4/2010 | Pal | 725/151 |
| 2010/0119242 A1* | 5/2010 | Hayashi | 398/210 |
| 2010/0277653 A1* | 11/2010 | Liao et al. | 348/734 |

* cited by examiner

APPARATUS, SYSTEMS AND METHODS FOR COMPENSATING INFRARED NOISE IN AN ELECTRONIC SYSTEM

PRIORITY CLAIM

This patent application is a Continuation of U.S. Non-Provisional patent application Ser. No. 12/643,602, filed Dec. 21, 2009, published as U.S. Publication No. 2011/0150483, entitled "APPARATUS, SYSTEMS AND METHODS FOR COMPENSATING INFRARED NOISE IN AN ELECTRONIC SYSTEM," and issued as U.S. Pat. No. 8,467,685 on Jun. 18, 2013, the content of which is herein incorporated by reference in its entirety.

BACKGROUND

Media devices, such as a set top box, a stereo, a television, a computer system, a game system, or the like, are often configured to receive operating instructions from a user via a remote control. The remote control communicates user instructions to the media device using an infrared signal. Other electronic devices also use infrared for communications. Such electronic devices may receive communications from the remote control, or may receive infrared communications for other electronic devices.

However, display devices in proximity to the media device may emit infrared energy as a byproduct of the process of generating visible light when images are presented on the display to the user. For example, plasma televisions are known to emit infrared energy.

Further, some display devices are configured to use backlighting to improve the visual quality of displayed images. The level of backlighting is automatically adjustable based on sensed ambient lighting conditions. Such backlighting may also result in emitted infrared energy that may further interfere with the infrared energy communication signals emitted by the remote control. Since such backlighting is adjustable, the level of interfering emitted infrared energy associated with backlighting is subject to changes based on ambient lighting conditions.

Infrared energy emitted by a display device can, in some environments, interfere with infrared energy communication signals emitted by the remote control. Further, other devices can emit interfering infrared energy. If the infrared energy interference levels are substantial, the media device may not receive the infrared energy communication signals emitted by the remote control, or may not be able to properly decode the received infrared energy communication signals.

Accordingly, there is a need in the arts to mitigate the effect of infrared energy emitted by display devices that may interfere with reception of infrared energy communication signals emitted by the remote control.

SUMMARY

Systems and methods of compensating detected infrared energy to identify an infrared energy communication signal emitted by a remote control are disclosed. An exemplary embodiment detects first infrared energy, wherein the infrared energy communication signal is absent in the first infrared energy; determines compensation based on the first infrared energy; detects second infrared energy, wherein the infrared energy communication signal is present in the second infrared energy; and compensates the second infrared energy based on the determined compensation.

BRIEF DESCRIPTION OF THE DRAWINGS

Preferred and alternative embodiments are described in detail below with reference to the following drawings.

DETAILED DESCRIPTION

Figure 1:
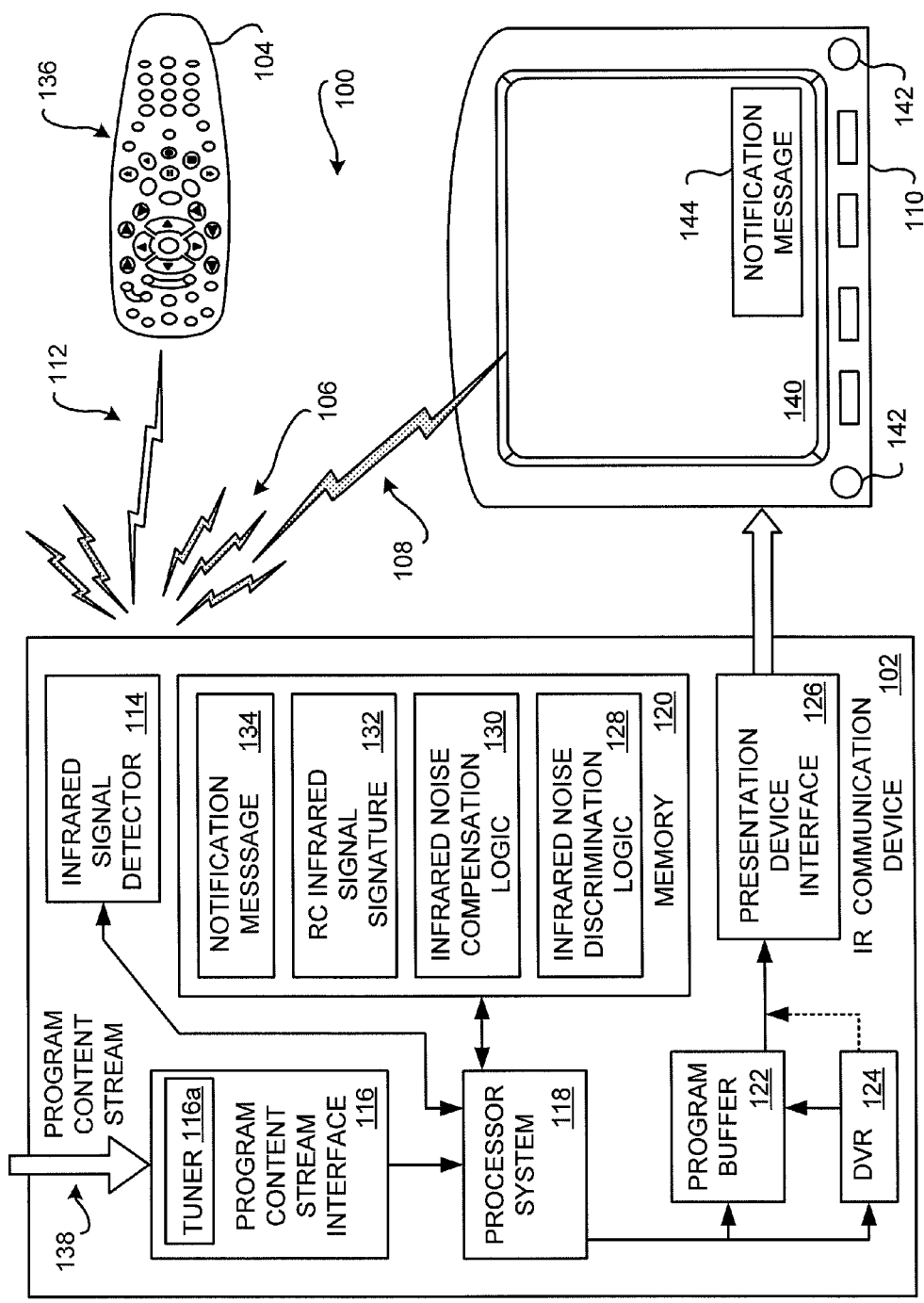
FIG. 1 is a block diagram of an embodiment of an infrared energy compensation system implemented in an exemplary media-based infrared (IR) communication device.

FIG. 1 is a block diagram of an embodiment of an infrared energy compensation system 100 implemented in an infrared communications receiving media device, referred to hereinafter as an infrared (IR) device 102. The exemplary media-based IR communication device 102 may be, but is not limited to, a set top box (STB). Embodiments of the infrared energy compensation system 100 may be implemented in other media devices, such as, but not limited to, stereos, radios, televisions (TVs), digital video disc (DVD) players, digital video recorders (DVRs), game playing devices, or personal computers (PCs) that are configured to receive communications from a remote control 104.

Other electronic devices also use infrared signaling for communications. Such IR electronic devices may receive communications from the remote control 104, from another type of remote control, or from other electronic devices. These other types of electronic devices include alternative embodiments of the infrared energy compensation system 100. Non-limiting examples of such IR electronic devices include a Sling device that receives IR communications for other IR communication-based devices, a personal computer (PC) that receives communications from an IR mouse and/or an IR keyboard, and electronic devices such as lamps, automatic blinds or shades, or security systems that receive instructions from a remote via an IR communications signal.

Embodiments of the infrared energy compensation system 100 monitor ambient levels of infrared energy 106 attributable to natural light and/or attributable to infrared energy 108 emitted from a media presentation device 110. In an exemplary embodiment, levels of the ambient infrared energy 106 are detected on a real time basis or a near real time basis. The infrared energy communication signal 112 is absent in the detected ambient infrared energy 106.

In an exemplary embodiment, an ambient infrared energy signature is determined from the detected ambient infrared energy 106 (when the infrared energy communication signal 112 transmitted from the remote control 104 is absent). Compensation is then determined based on the ambient infrared energy signature.

Further, characteristics of an infrared energy communication signal 112, referred to as a remote control (RC) infrared energy signature, may be known, or may be determinable at the IR communication device 102, based on a received infrared energy communication signal 112 transmitted from the remote control 104. Compensation may be alternatively, or additionally, determined based on the RC infrared energy signature Accordingly, when the infrared energy communication signal 112 transmitted from the remote control 104 is received, the detected infrared energy received at an infrared signal detector 114 can be compensated based on the determined compensation. Accordingly, the infrared energy communication signal 112 transmitted from the remote control 104 can be reliably decoded by the IR communication device 102.

The non-limiting exemplary media-based IR communication device 102 comprises the infrared signal detector 114, a program content stream interface 116, a processor system 118, a memory 120, a program buffer 122, an optional digital video recorder (DVR) 124, and a presentation device interface 126. The memory 120 comprises portions for storing the infrared noise discrimination logic 128, the infrared noise compensation logic 130, the remote control (RC) infrared signal signature 132, and an optional notification message 134. In some embodiments, the infrared noise discrimination logic 128 and the infrared noise compensation logic 130 may be integrated together, and/or may be integrated with other logic. Other media devices may include some, or may omit some, of the above-described media processing components. Further, additional components not described herein may be included in alternative embodiments.

As noted above, a viewer (not shown) may provide instructions via the remote control 104. The viewer generates instructions by operation of a plurality of actuators 136, such as the exemplary buttons, residing on the remote control 104. Upon receipt of the infrared energy communication signal 112 transmitted from the remote control 104, the IR communication device 102 can then control itself and the various media devices that it is communicatively coupled to, such as the media presentation device 110, in accordance with the generated viewer instructions.

The functionality of the IR communication device 102, here a set top box, is now broadly described. A program provider provides program content that is received in one or more program content streams 138. A program content stream 138 typically comprises a plurality of programs multiplexed together. The one or more program content streams 138 are communicated to the IR communication device 102 from a media system sourced from a remote head end facility (not shown) operated by a media provider. Non-limiting examples of such media systems include satellite systems, cable systems, and the Internet. For example, if the program provider provides programming via a satellite-based communication system, the IR communication device 102 is configured to receive one or more broadcasted satellite signals detected by an antenna (not shown) that is communicatively coupled to the IR communication device 102. Alternatively, or additionally, the program content stream 138 can be received from one or more different sources, such as, but not limited to, a cable system, a radio frequency (RF) communication system, or the Internet The one or more program content streams 138 are received by the program content stream interface 116. One or more tuners 116a in the program content stream interface 116 selectively tune to one of the program content streams 138 in accordance with instructions received from the processor system 118. The processor system 118, based upon a request for a program of interest specified by the viewer, parses out program content associated with the program of interest. The program of interest is then assembled into a stream of video and/or audio information which may be stored by the program buffer 122 such that the program content can be streamed out to the media presentation device 110, via the presentation device interface 126. Alternatively, or additionally, the parsed out program content may be saved into the DVR 124 for later presentation. In alternative embodiments, the program content streams 138 may be stored for later decompression, processing and/or decryption.

In this simplified embodiment, the presentation device interface 126 is illustrated as coupled to a single exemplary media presentation device 110, such as a television. The video portion of the streamed program content is displayed on the display 140 and the audio portion of the streamed program content is reproduced as sounds by the speakers 142. Alternatively, or additionally, the IR communication device 102 may be communicatively coupled to other types of media presentation devices. Typically, the media presentation devices 110 are controllable by the IR communication device 102. Accordingly, the viewer may selectively control the IR communication device 102 and a variety of media presentation devices 110 using the remote control 104.

In an exemplary embodiment, characteristics of the infrared energy communication signal 112 emitted by the remote control 104 (in the absence of, or substantially in the absence of, ambient levels of infrared energy 106 and/or interfering emitted infrared energy 108) is stored in the RC infrared signal signature 132 portion of the memory 120. Such characteristics of the RC infrared signal signature may include the range of infrared energy frequencies of the infrared energy communication signal 112 and/or the magnitude of the infrared energy communication signal 112. Further, characteristics of the carrier signal of the infrared energy communication signal 112, which is used to communicate information corresponding to viewer instructions, may be included as part of the RC infrared signal signature.

The information stored in the RC infrared signal signature 132 can be predefined. For example, test data of the remote control 104, or a like remote control, may be stored prior to delivery of the IR communication device 102 to the viewer. Further, a plurality of RC infrared signal signatures for a variety of remote controls that are anticipated to be encountered by the IR communication device 102 may be stored in the RC infrared signal signature 132 portion of memory 120.

Alternatively, the signature of the RC energy communication signal 112 can be determined by sensing known commands received in a infrared energy communication signal 112 emitted by the remote control 104. For example, a test signal or the like may be emitted by the remote control 104, thereby accounting for ambient light conditions and the position and orientation of the remote control 104 with respect to the IR communication device 102. The determined RC infrared signal signature can then be stored in the RC infrared signal signature 132 portion of the memory 120.

In an exemplary embodiment, the RC infrared signal signature can be determined when the IR communication device 102 is initially activated. Alternatively, or additionally, the RC infrared signal signature can be determined periodically at times when there is no, or or relatively little amounts of, ambient levels of infrared energy 106 (and presumably, no or little infrared energy 108 emitted from a media presentation device 110).

Based upon the determined RC infrared signal signature, the IR communication device 102 can calibrate itself to the particular remote control 104, or even a plurality of remote controls 104, for the particular environment that the system is being operated in. For example, the position and/or orientation of the remote control 104 relative to the IR communication device 102 may change from time to time. Periodic calibration allows compensation based on the current position and/or orientation of the remote control 104.

In the various embodiments, the infrared signal detector 114 monitors the ambient levels of infrared energy 106. Such monitoring may be performed continuously on a real time basis, may be monitored periodically on a near real time basis, or may be monitored after a predefined duration of time. The ambient levels of infrared energy 106, which may include the infrared energy 108 emitted from the media presentation device 110, is detected by the infrared signal detector 114 at times when the infrared energy communication signal 112 is not being transmitted from the remote control 104. The processor system 118, executing the infrared noise discrimination logic 128, determines characteristics of the current ambient infrared energy 106, referred to as the ambient infrared energy signature. The determined characteristics of the ambient infrared energy signature may include magnitude of infrared energy at various frequencies of infrared energy. The determined ambient infrared energy signature may be stored in the memory 120 or in another suitable medium for comparison to the RC infrared signal signature.

Since the ambient levels of infrared energy 106 may change over time, and since the infrared energy 108 emitted from a media presentation device 110 changes in response to changes in ambient lighting, the ambient infrared energy signature is determined on a real time, or near real time basis, in an exemplary embodiment. Accordingly, when the infrared energy 108 emitted from a media presentation device 110 changes by an amount greater that a predefined threshold, a current ambient infrared energy signature is determined and the compensation is changed to a new value based on the newly determined current ambient infrared energy signature.

The infrared signal detector 114 is configured to detect infrared energy regardless of the source of the detected infrared energy. Accordingly, when the infrared energy communication signal 112 is transmitted from the remote control 104, the infrared signal detector 114 detects the ambient levels of infrared energy 106, any infrared energy 108 emitted from the display 140 of the media presentation device 110, and the emitted infrared energy communication signal 112.

Processor system 118, executing the infrared noise compensation logic 130, compares the currently detected infrared energy (which includes the infrared energy communication signal 112 emitted from the remote control 104) with the most currently available ambient infrared energy signature. Additionally, or alternatively, the currently detected infrared energy may be compared with the RC infrared signal signature. Based upon a difference between the currently detected infrared energy and the ambient infrared energy signature, and/or the RC infrared signal signature, signal compensation is determined.

The currently detected infrared energy is then compensated based upon the determined compensation to determine a compensated infrared energy communication signal. Accordingly, infrared energy associated with the background lighting emitted by the display 140 of the media presentation device 110 is compensated. After compensation, the compensated infrared energy communication signal corresponds substantially to the infrared energy communication signal 112 emitted from the remote control 104.

In the various embodiments, any suitable signal processing technique may be used to analyze the detected ambient infrared energy 106 (which also includes any infrared energy 108 emitted from the display 140 of the media presentation device 110). The ambient infrared energy signature can be determined based upon frequency domain analysis and/or time domain analysis of the detected ambient infrared energy 106. An exemplary embodiment employs a Fourier transform signal analysis technique to determine the ambient infrared energy signature.

In some situations, the ambient infrared energy 106 (which also includes any infrared energy 108 emitted from the display 140 of the media presentation device 110) may be so high that the detected infrared energy cannot be sufficiently compensated for. That is, even with compensation, the infrared energy communication signal 112 is not readily discernible by the IR communication device 102. In such situations, an alternative embodiment is configured to retrieve the notification message 134 from memory 120, and cause the notification message 134 to be presented on the display 140 of the media presentation device 110. Accordingly, the viewer will be notified that the remote control 104 may not be operational due to interfering infrared energy.

Any suitable message may be used for the notification message 134. The message may include suggested actions that could be performed by the viewer to mitigate the effect of the interfering infrared energy. For example, the viewer may be advised to change the location and/or to re-orient the direction of the remote control 104 relative to the IR communication device 102. Alternatively, or additionally, the viewer may be advised to move the location of the IR communication device 102 relative to potential sources of interfering infrared energy, such as the infrared energy emitted by the display 140 of the media presentation device 110. Alternatively, or additionally, the viewer may be advised to close blinds or drapes so as to darken the environment. Darkening the environment might, in some situations, reduce the amount of ambient infrared energy originating from sunlight. Further, darkening the environment may alter the backlighting level of the display 140 (thereby reducing the interfering infrared energy emitted by the display 140 of the media presentation device 110).

In some embodiments, an audible sound, such as a tone or verbal message, may be emitted to notify the viewer that the remote control 104 may not be operational. Alternatively, or additionally, an indicator light, such as a flashing light emitting diode disposed on a visible surface of the IR communication device 102, may be illuminated to notify the viewer.

In some embodiments, the notification to the user may change as a function of a decrease, or an increase, in the infrared interference. In some embodiments, the pulse frequency, the pulse duration, and/or an intensity of a flashing light or an audible tone may indicate the increase/decrease in the infrared interference. For example, the intensity of a flashing light or audible tone may decrease as the user takes an action that reduces the infrared interference. Conversely, if the user's actions increase the infrared interference, the the intensity of a flashing light or audible tone may be increased.

Figure 2:
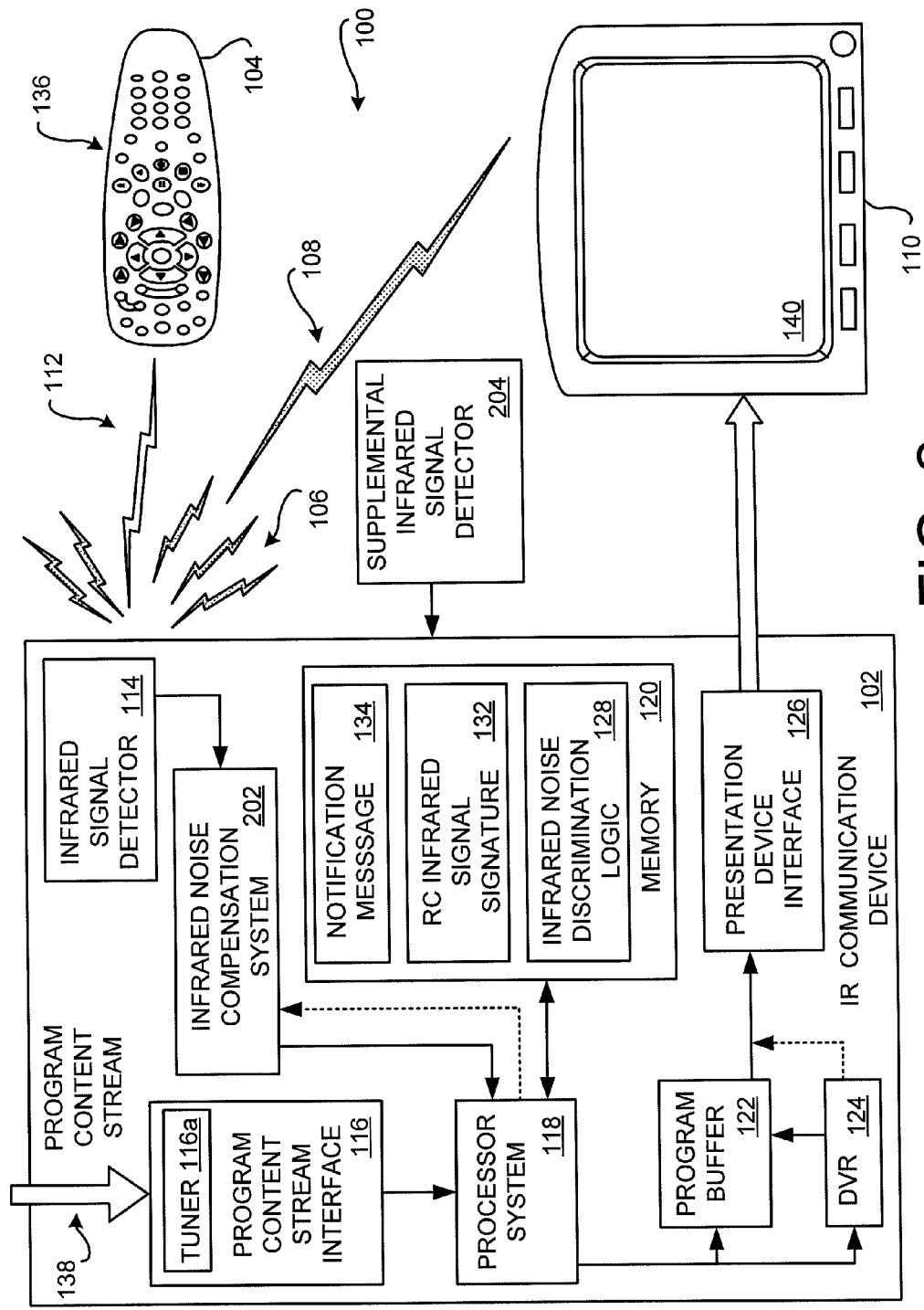
FIG. 2 is a block diagram of an alternative embodiment of the infrared energy compensation system implemented in the IR communication device.

FIG. 2 is a block diagram of an embodiment of a firmware-based infrared energy compensation system 100 implemented in the IR communication device 102. This embodiment includes an infrared noise compensation system 202 implemented as firmware, or as a combination of firmware and software. In some embodiments, filters and other electronic devices may reside in the infrared noise compensation system 202 for conditioning the detected infrared energy to determine the infrared energy communication signal 112 emitted from the remote control 104.

In an exemplary embodiment, as part of the initialization of the IR communication device 102, the amount of compensation is determined and compensation information is provided to the infrared noise compensation system 202. The infrared energy detected by the infrared signal detector 114 is then compensated by the infrared noise compensation system 202.

In some embodiments, a predefined amount of compensation may be used when the IR communication device 102 is initialized (turned on). Or, the last amount of determined compensation may be used.

In some embodiments, the compensated infrared energy signal is periodically analyzed by the processor system 118 to identify changes in the ambient infrared energy 106 (which also includes any infrared energy 108 emitted from the media presentation device 110). The compensation performed by the infrared noise compensation system 202 is bypassed, or discontinued, on the periodic basis so that the infrared energy detected by the infrared signal detector 114 can be analyzed without any compensation. The processor system 118 determines the suitable amount of compensation, and then adjusts the infrared noise compensation logic 130 accordingly. Then, when the remote control 104 emits the infrared energy communication signal 112, the information encoded in the infrared energy communication signal 112 is readily discernible by the IR communication device 102.

In an alternative embodiment, infrared energy may be additionally, or alternatively, detected by a supplemental infrared signal detector 204. For example, a satellite signal receiver may be configured to also detect infrared energy. In such embodiments, the degree of compensation can be alternatively, or additionally, based on information provided by the supplemental infrared signal detector 204. The supplemental infrared signal detector 204 may be external to the IR communication device 102 and/or may be internal to the IR communication device 102.

Figure 3:
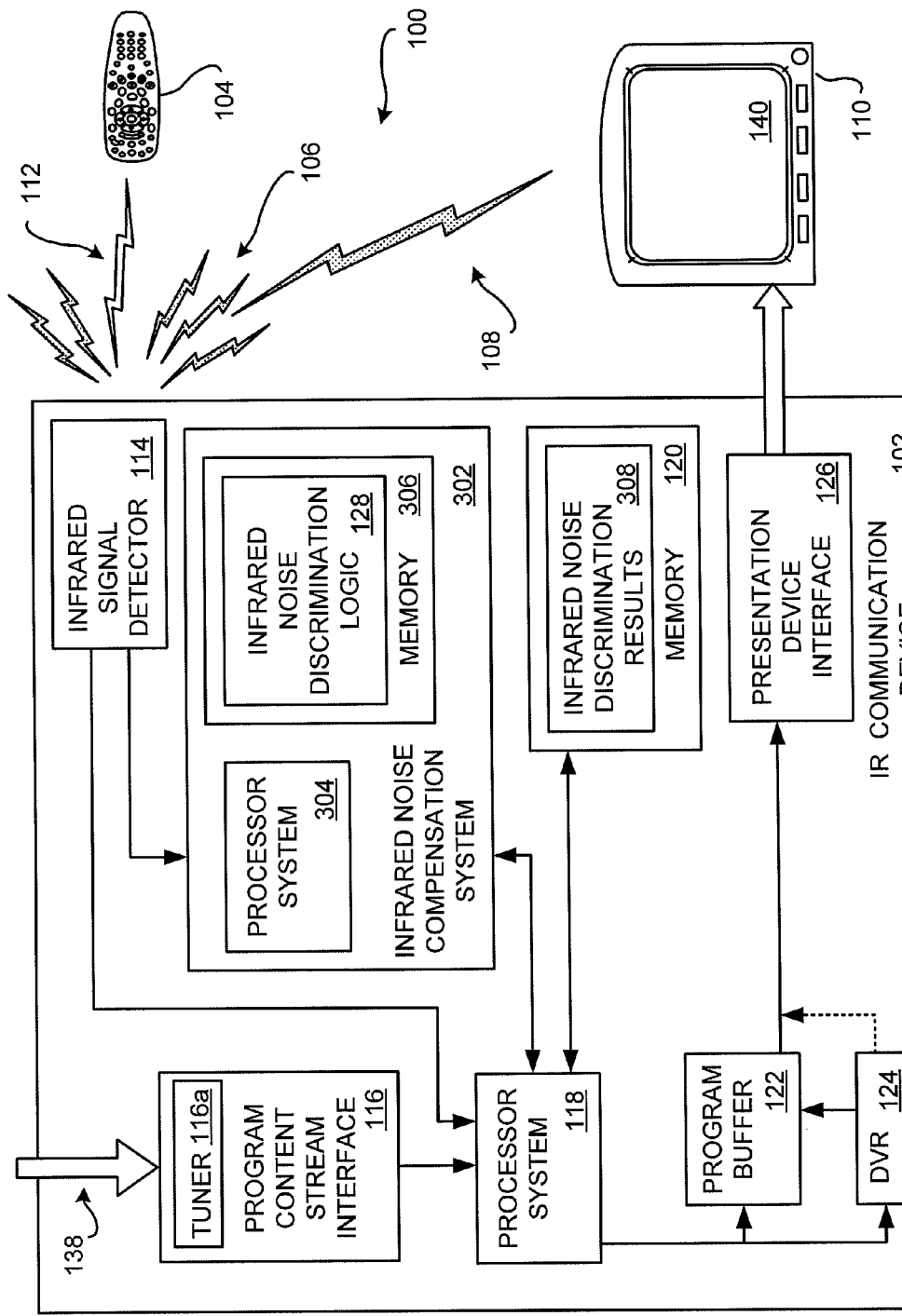
FIG. 3 is a block diagram of another alternative embodiment of an infrared energy compensation system implemented in an exemplary IR communication device.

FIG. 3 is a block diagram of another alternative embodiment of an infrared energy compensation system 100 implemented in an exemplary IR communication device 102 that employs a distributed processing architecture approach to evaluating the infrared interference. Using the distributed processing architecture approach, the infrared noise compensation system 302 has its own processor system 304 and an optional memory 306. Thus, operational tasks associated with the operation of the IR communication device 102 can be managed by the processor system 118, and processes relating to the infrared interference can be managed by the processor system 304. The processor system 304 may be any suitable processor or device. The processing system 304 may be a commercially available processor, a microprocessor, or a specially designed and fabricated processor.

In some embodiments, information pertaining to infrared interference, as determined by the infrared noise compensation system 302, is communicated to the processor system 118. The received infrared interference information may be save in the infrared noise results 308 portion of memory 120, or may be stored in another suitable memory, for later retrieval.

Figure 4:
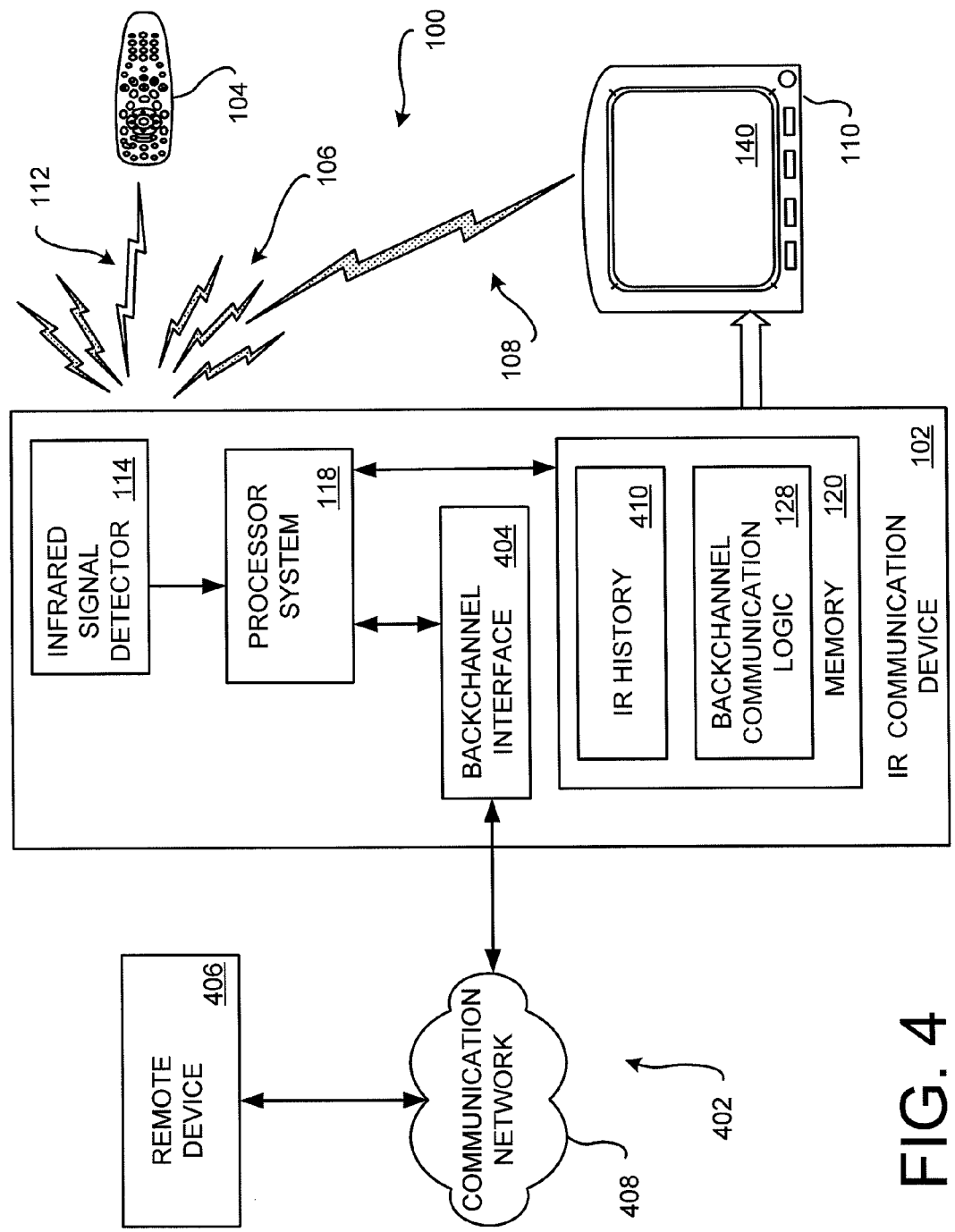
FIG. 4 is a block diagram of an embodiment of an infrared energy compensation system implemented in an exemplary IR communication device with a backchannel that supports communications between the IR communication device and a remote device.

FIG. 4 is a block diagram of an embodiment of an infrared energy compensation system 100 implemented in an exemplary IR communication device 102 with a backchannel 402 that supports communications between a backchannel interface 404 in the IR communication device 102 and a remote device 406. The exemplary backchannel 402 is a two-way communication system that communicatively couples the IR communication device 102 and the remote device 406 via a communication network 408. The backchannel interface 404 may be any suitable communication device or system operable to communicate over the communication network 408.

The features of the exemplary embodiment illustrated in FIG. 4 may be incorporated with other embodiments. Further, this embodiment includes an optional IR history 410 residing in the memory 120 that is configures to store information pertaining to previously monitored levels of infrared interference.

Communication over the backchannel 402 is established over a physical path and/or a logical path, referred to herein as a link. Once the backchannel 402 is established between the IR communication device 102 and the remote device 406, information pertaining to the infrared interference, and optionally information pertaining to remedial actions that might be taken to reduce the infrared interference, can be communicated between the IR communication device 102 and the remote device 406.

The communication network 408 is illustrated as a generic communication system. In one embodiment, the communication network 408 comprises the Internet. Accordingly, the backchannel interface 404 is a modem or other type of Internet communication device. Alternatively, the communication network 408 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, the backchannel interface 404 is configured to establish a communication link or the like with the communication network 408 on an as-needed basis, and is configured to communicate over the particular type of communication network 408 that it is coupled to.

In an exemplary embodiment, the remote device 406 resides at a service facility or customer facility, and is operated by a service representative or the like. In response to receiving a telephone call or e-mail query from the user relating to problems of that they are apparently having with their remote 104 communicating with the IR communication device 102, the service representative can receive information pertaining to the infrared interference directly from the IR communication device 102. Thus, the service representative can determine if infrared interference is causing problems to the remote control 104, and if so, can determine the extent of the infrared interference.

The service representative may access the store information pertaining to previously monitored levels of infrared interference from the IR history 410. The history may indicate changes in infrared interference or other information that may be useful to the service representative in diagnosing possible sources of infrared interference and in identifying potential remedial actions.

In some embodiments, the service representative may provide instructions directly to the IR communication device 102 such that one or more suitable remedial actions are automatically implemented by the IR communication device 102 to reduce the infrared interference. Alternatively, or additionally, the service representative can interact with the user and provide instructions to have the user implement the remedial actions. For example, the service representative may instruct the user to close blinds so that a plasma TV generating the infrared interference adjusts its backlighting, thereby reducing the amount of infrared interference.

Further, changes in the the infrared interference can be communicated back to the remote device 406. For example, the service representative can determine if the remedial actions are reducing the infrared interference, and/or interact with the user to determine if the remote control 104 is properly operating after implementation of the remedial actions.

It should be emphasized that the above-described embodiments of the infrared energy compensation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method comprising:
   detecting first infrared energy at a first time at an infrared (IR) signal detector of a device that is controllable by a remote control, wherein an infrared energy communication signal emitted from the remote control is absent in the detected first infrared energy;
   determining an amount of background ambient infrared energy based on the first infrared energy;
   determining a compensation based on the amount of background ambient infrared energy;
   detecting second infrared energy at a second time at the IR signal detector of the device, wherein the second time is after the first time, and wherein the detected second infrared energy includes at least the infrared energy communication signal communicated from the remote control;
   compensating the second infrared energy based on the determined compensation; and
   determining the infrared energy communication signal from the compensated second infrared energy.

2. The method of claim 1, further comprising:
   retrieving information corresponding to a known remote control (RC) infrared signal from a memory,
   wherein the second infrared energy is further compensated based on the retrieved information corresponding to the known RC infrared signal.

3. The method of claim 1, further comprising:
   determining that the infrared energy communication signal is not discernible from the compensated second infrared energy; and
   indicating that the remote control is not operational in response to determining that the infrared energy communication signal is not discernible.

4. The method of claim 3, wherein indicating that the remote control is not operational comprises:
   retrieving a visual notification message from a memory; and
   communicating the visual notification message to a media presentation device,
   wherein the visual notification message is presented on a display to a user of a device emitting the infrared energy communication signal.

5. The method of claim 3, wherein indicating that the remote control is not operational comprises:
   issuing an audible alarm,
   wherein a characteristic of the audible alarm corresponds to a magnitude of the first infrared energy.

6. The method of claim 3, wherein indicating that the remote control is not operational comprises:
   illuminating an indicator light, wherein a characteristic of the illumination from the indicator light corresponds to a magnitude of the first infrared energy.

7. The method of claim 1, wherein after a predefined duration, the method further comprises:
   detecting third infrared energy, wherein the infrared energy communication signal is absent in the third infrared energy;
   determining a new amount of background ambient infrared energy based on the third infrared energy;
   determining new compensation based on the new amount of background ambient infrared energy;
   subsequently detecting fourth infrared energy, wherein the infrared energy communication signal is present in the fourth infrared energy; and
   compensating the fourth infrared energy based on the determined new compensation.

8. The method of claim 1, further comprising:
   comparing the detected amount of background ambient infrared energy with a threshold amount of background ambient infrared energy,
   wherein the second infrared energy is only compensated when the detected amount of background ambient infrared energy exceeds the threshold amount of background ambient infrared energy.

9. The method of claim 1, wherein the infrared energy communication signal emitted by the remote control is a first infrared energy communication signal emitted by a first remote control, the method further comprising:
   detecting third infrared energy, wherein a second infrared energy communication signal emitted by a second remote control is present in the third infrared energy; and
   compensating the third infrared energy based on the determined compensation.

10. A method comprising:
    detecting first infrared energy at a first time at an infrared (IR) signal detector of a device that is controllable by a remote control, wherein an infrared energy communication signal emitted from the remote control is absent in the detected first infrared energy;
    determining an amount of background ambient infrared energy based on the first infrared energy;
    determining a compensation based on the background ambient infrared energy;
    detecting second infrared energy at a second time at the IR signal detector of the device, wherein the second time is after the first time, and wherein the detected second infrared energy includes at least the infrared energy communication signal communicated from the remote control;
    compensating the second infrared energy based on the determined compensation;
    determining that the infrared energy communication signal is not discernible from the compensated second infrared energy because of interference caused by the background ambient infrared energy; and
    indicating that the remote control is not operational in response to determining that the infrared energy communication signal is not discernible in the detected second infrared energy.

11. The method of claim 10, wherein indicating that the remote control is not operational comprises:
    retrieving a visual notification message from a memory; and
    communicating the visual notification message to a media presentation device,
    wherein the visual notification message is presented on a display to a user of a device emitting the infrared energy communication signal, 12. The method of claim 11, wherein the visual notification message indicates that the user of the remote control should take at least one remedial action to reduce a current amount of background ambient infrared energy.

13. The method of claim 10, wherein indicating that the remote control is not operational comprises:
    issuing an audible alarm,
    wherein a characteristic of the audible alarm corresponds to a magnitude of the first infrared energy.

14. The method of claim 10, wherein indicating that the remote control is not operational comprises:
illuminating an indicator light, wherein a characteristic of the illumination from the indicator light corresponds to a magnitude of the first infrared energy.

15. The method of claim 10, wherein after a predefined duration after indicating that the remote control is not operational, the method further comprises:
detecting third infrared energy, wherein the infrared energy communication signal is absent in the third infrared energy, and wherein the detected third infrared energy corresponds to a new amount of background ambient infrared energy;
determining new compensation based on the new background ambient infrared energy;
subsequently detecting fourth infrared energy, wherein the infrared energy communication signal is present in the second infrared energy; and
compensating the fourth infrared energy based on the determined new compensation.

16. The method of claim 10, further comprising:
comparing the detected amount of background ambient infrared energy with a threshold amount of background ambient infrared energy,
wherein the second infrared energy is only compensated when the detected amount of background ambient infrared energy exceeds the threshold amount of background ambient infrared energy.

17. The method of claim 10, further comprising:
comparing the detected amount of background ambient infrared energy in the detected first infrared energy with a threshold amount of background ambient infrared energy; and
indicating that the remote control is not operational in response to determining that the detected amount of background ambient infrared energy exceeds the threshold amount of background ambient infrared energy.

18. A media system, comprising:
a media device with an infrared (IR) detector configured to detect infrared energy, wherein the media device is configured to receive programming and configured to process the programming for presentation to a viewer;
a remote control configured to communicate instructions to the media device via an infrared energy communication signal; and
a media presentation device configured to present the processed programming on a display,
wherein the media device is further configured to:
detect first infrared energy at a first time at an infrared (IR) signal detector of a device that is controllable by a remote control, wherein the infrared energy communication signal emitted from the remote control is absent in the detected first infrared energy;
determine an amount of background ambient infrared energy based on the first infrared energy;
determine a compensation based on the amount of background ambient infrared energy;
detect second infrared energy at a second time at the IR signal detector of the device, wherein the second time is after the first time, and wherein the detected second infrared energy includes at least the infrared energy communication signal communicated from the remote control;
compensate the second infrared energy based on the determined compensation; and
determining the infrared energy communication signal from the compensated second infrared energy,
wherein the received programming is processed in accordance with at least one instruction determined from the infrared energy communication signal.

19. The media system of claim 18, wherein the IR signal detector is a first IR signal detector that resides in the media device and is configured to detect the second infrared energy, and further comprising:
a second IR signal detector configured to detect the first infrared energy, wherein the second IR signal detector is portable remote device configured to communicate the detected first infrared energy to the media device.

20. The media system of claim 18, wherein the media device is further configured to:
determine that the infrared energy communication signal is not discernible from the compensated second infrared energy; and
indicate that the remote control is not operational in response to determining that the infrared energy communication signal is not discernible.

* * * * *